Patented Oct. 23, 1928.

1,688,553

UNITED STATES PATENT OFFICE.

HENRY CHARLES OLPIN, OF SPONDON, NEAR DERBY, ENGLAND, ASSIGNOR TO CELANESE CORPORATION OF AMERICA, A CORPORATION OF DELAWARE.

DYEING OF MATERIALS MADE WITH OR CONTAINING CELLULOSE DERIVATIVES.

No Drawing. Application filed April 11, 1927, Serial No. 183,014, and in Great Britain February 9, 1927.

This invention relates to the dyeing, printing and stencilling (all hereinafter in the claims included in the term dyeing) of threads, yarns, knitted or woven fabrics, or other products made of or containing cellulose acetate or other organic acid esters of cellulose, such for example as cellulose formate, propionate or butyrate, or the products obtained by treatment of alkalized cellulose with sulphochlorides (e. g. the product known as "immunized cotton" obtained with p-toluene sulpho-chloride), or made of or containing cellulose ethers, such as methyl, ethyl or benzyl cellulose, or the corresponding condensation products of cellulose and glycols or other polyhydric alcohols, all of which cellulose derivatives are hereinafter referred to as organic substitution derivatives of cellulose.

According to the present invention materials made of or containing one or more of the said organic substitution derivatives of cellulose are dyed or otherwise colored with sulphuric esters of anthraquinonyl-amino alcohols or with salts, such as the alkali salts, of such esters, that is to say with sulphuric esters (or their salts) of amino or mono-substituted amino derivatives of anthraquinone or substituted anthraquinones, wherein one or both of the hydrogen atoms are replaced by one or two aliphatic groupings containing one, two or more hydroxy groups, whether such aliphatic grouping or groupings are substituted or not by other groups. It will be understood that the anthraquinone nucleus may have two or more amino groups so substituted, that in the case of a sulphuric ester (or salt) of a polyalcoholic compound one only or any number of the alcohol groups may be esterified and further that compounds may be employed which, in addition to amino groups substituted as stated above, may contain any other desired substituents such as free or substituted amino groups, alkyl or alkoxy groups, phenolic groups, halogen substituents or the like.

The sulphuric esters for use according to the present invention may be prepared by any convenient method, such for example as by treating the corresponding alcoholic compound with sulphuric acid at 90–100° C. or with oleum at lower temperatures until solubility in sodium carbonate is attained, by the action of sulphuric esters of amino-alcohols on leuco hydroxyanthraquinones such as the leuco compounds of $\alpha$-hydroxy anthraquinone, 1-4-dihydroxyanthraquinone, 1.4.5-trihydroxyanthraquinone or 1.4.5.8-tetrahydroxyanthraquinone, followed by oxidation of the leuco body obtained, or by replacement of chlor, nitro, methoxy etc. groups by treatment with sulphuric esters of amino-alcohols e. g. $\beta$-amioethylalcohol. The alcoholic bodies themselves, for treatment with sulphuric acid or oleum, may be obtained by treatment of amino or mono- substituted amino derivatives of anthraquinone or substituted anthraquinones with halohydrins, such as ethylene chlorhydrin, propylene chlorhydrins, glyceryl chlorhydrins, epichlorhydrin, chlorbutylene glycol or the like or with alkylene oxides such as ethylene or propylene oxide or with hydroxy aldehydes or ketones or by replacement of chlor, nitro, hydroxy, methoxy etc. groups by treatment with an amino alcohol.

The esters or their salts are further found to have affinity for animal fibres but in general to leave cellulose fibres undyed and accordingly the present invention further comprises the production of solid or differential effects on materials comprising one or more organic substitution derivatives of cellulose and animal fibres such as wool, silk or the like or cellulosic fibres such as cotton or the cellulosic type of artificial silk. When dyeing or otherwise coloring mixed goods comprising one or more organic substitution derivatives of cellulose and a cellulosic fibre or fibres, other dyestuffs may be used for the cellulosic component and applied before, after or together with the dyestuffs of the present invention, The following are some examples of dyestuffs which may be used, it being understood that they are given only by way of illustration and are in no way limitative.

| | Shade. |
|---|---|
| Sulphuric ester of 1-β-hydroxyethylaminoanthraquinone | Scarlet |
| Sulphuric ester of 1-β-hydroxyethylamino-2-methylanthraquinone | Scarlet |
| Sulphuric ester of 1-β-hydroxyethylamino-4-hydroxyanthraquinone | Violet |
| Sulphuric ester of 1-β-hydroxyethylamino-4-aminoanthraquinone | Blue-violet |
| Sulphuric ester of 1-β-hydroxyethylamino-2-brom-4-aminoanthraquinone | Blue-violet |
| Sulphuric ester of 1-β-hydroxyethylamino-4-methylaminoanthraquinone | Pure blue |
| Sulphuric ester of 1.4-di-β-hydroxyethylaminoanthraquinone | Pure blue |
| Sulphuric ester of 1.5-di-β-hydroxyethylaminoanthraquinone | Bluish red |

The dyeing, printing or stencilling may be performed in any suitable manner. Thus for example the dyestuffs may be applied from aqueous solutions with suitable additions of Glauber's salt and formic or other suitable acid to assist the dyeing. For printing the aqueous solutions may be thickened with suitable thickening agents, such as gum arabic, dextrine and the like, suitable additions being made to the paste if required. The prints are afterwards dried, steamed or aged and finished as required.

The following examples of dyeing and printing are intended to be illustrative and not in any way limitative.

Example 1.

Two pounds of the sodium salt of 1-β-hydroxyethylaminoanthraquinone sulphuric ester are dissolved in sufficient hot water and the solution added to a dyebath containing 250 gallons of water. Thirty pounds of 10% acetic acid are added and 100 lbs. of cellulose acetate yarn in hank form, which has been previously wetted out, are entered. The temperature of the bath is raised slowly to 75–80° C. during ¾ hour and is maintained at this temperature for 1 hour, 20 lbs. of Glauber's salt being added slowly as dyeing proceeds to obtain maximum exhaustion. The goods, now dyed a bright scarlet shade, are lifted, drained and rinsed and may be dried or otherwise treated as desired.

Example 2.

Two pounds of the sodium salt of 1-methylamino-4-β-hydroxyethylaminoanthraquinone sulphuric ester are dissolved in sufficient water and the solution added to a dyebath containing 250 gallons of water and 30 lbs. of 10% acetic acid. Dyeing is then carried out as in Example 1. The goods, dyed a full shade of blue, are lifted, drained, rinsed, and dried or otherwise treated as desired.

Example 3.

To print a scarlet shade on cellulose acetate fabric, a printing paste is made up as follows:—

30 parts sodium salt of 1-β-hydroxyethylaminoanthraquinone sulphuric ester.
30 parts methylated spirit.
280 parts water.
600 parts gum arabic 50% solution.
60 parts potassium thiocyanate 50% solution.

The fabric is printed with the above paste by any desired means, steamed for half an hour at atmospheric pressure, washed cold and soaped lightly if necessary. The goods may then be dried or otherwise finished as required.

What I claim and desire to secure by Letters Patent is:—

1. Process for dyeing materials comprising an organic substitution derivative of cellulose, comprising applying thereto a sulphuric ester of an anthraquinonylamino alcohol.

2. Process for dyeing materials comprising an organic substitution derivative of cellulose, comprising applying thereto a sulphuric ester of an anthraquinonylamino alcohol in the form of a soluble salt thereof.

3. Process for dyeing materials comprising an organic substitution derivative of cellulose, comprising applying thereto a sulphuric ester of a substituted anthraquinonylamino alcohol.

4. Process for dyeing materials comprising an organic substitution derivative of cellulose, comprising applying thereto a sulphuric ester of a substituted anthraquinonylamino alcohol in the form of a soluble salt thereof.

5. Process for dyeing materials comprising cellulose acetate, comprising applying thereto a sulphuric ester of an anthraquinonylamino alcohol.

6. Process for dyeing materials comprising cellulose acetate, comprising applying thereto a sulphuric ester of an anthraquinonylamino alcohol in the form of a soluble salt thereof.

7. Process for dyeing materials comprising cellulose acetate, comprising applying thereto a sulphuric ester of an anthraquinonylamino alcohol in the form of an alkali salt thereof.

8. Process for dyeing materials comprising cellulose acetate, comprising applying thereto a sulphuric ester of a substituted anthraquinonylamino alcohol.

9. Process for dyeing materials comprising cellulose acetate, comprising applying thereto a sulphuric ester of a substituted anthraquinonylamino alcohol in the form of a salt thereof.

10. Process for dyeing materials comprising cellulose acetate, comprising applying thereto a sulphuric ester of a substituted anthraquinonylamino alcohol in the form of an alkali salt thereof.

11. Process for dyeing materials comprising cellulose acetate and an animal or a cellulosic fibre in solid or differential effects, comprising applying thereto a sulphuric ester of an anthraquinonylamino alcohol.

12. Process for dyeing materials comprising cellulose acetate and an animal or a cellulosic fibre in solid or differential effects, comprising applying thereto a sulphuric ester of an anthraquinonylamino alcohol in the form of a soluble salt thereof.

13. Process for dyeing materials comprising cellulose acetate and an animal or a cellulosic fibre in solid or differential effects, comprising applying thereto a sulphuric ester of an anthraquinonylamino alcohol in the form of an alkali salt thereof.

14. Process for dyeing materials comprising cellulose acetate and an animal or a cellulosic fibre in solid or differential effects, comprising applying thereto a sulphuric ester of a substituted anthraquinonylamino alcohol.

15. Process for dyeing materials comprising cellulose acetate and an animal or a cellulosic fibre in solid or differential effects, comprising applying thereto a sulphuric ester of a substituted anthraquinonylamino alcohol in the form of a soluble salt thereof.

16. Process for dyeing materials comprising cellulose acetate and an animal or a cellulosic fibre in solid or differential effects, comprising applying thereto a sulphuric ester of a substituted anthraquinonylamino alcohol in the form of an alkali salt thereof.

In testimony whereof I have hereunto subscribed my name.

HENRY CHARLES OLPIN.